Feb. 17, 1970  N. P. HUFFNAGLE  3,496,484
OPTICAL MASER
Filed June 29, 1964
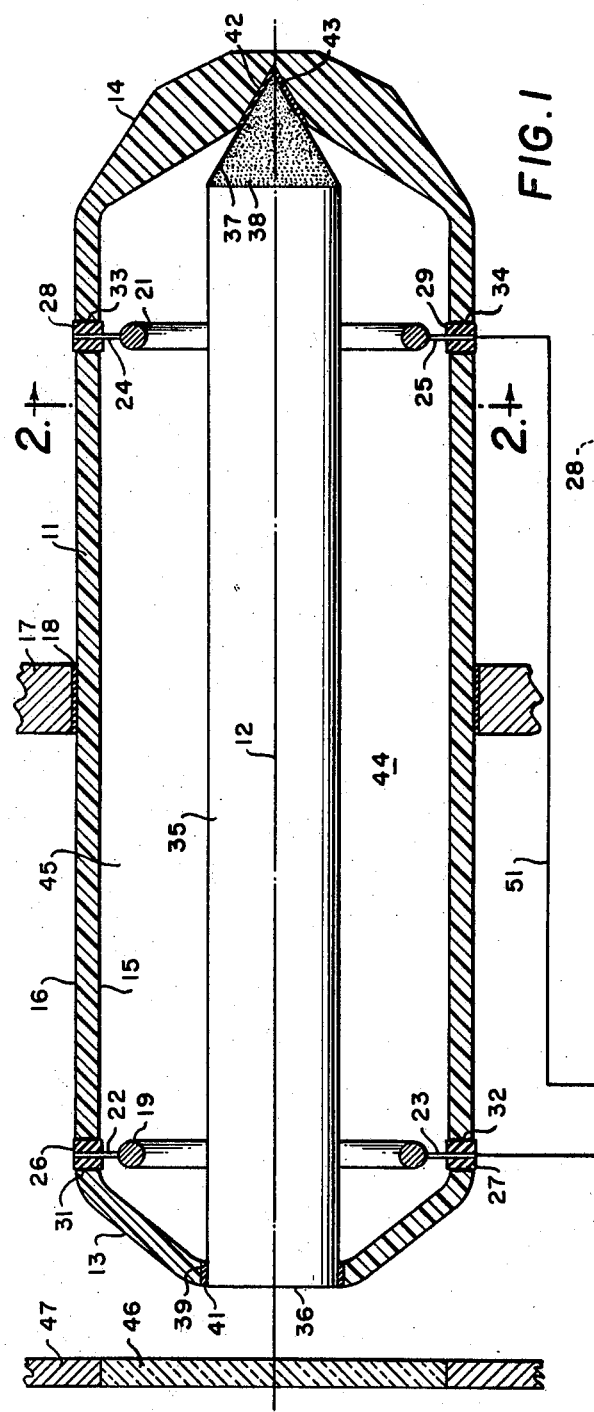
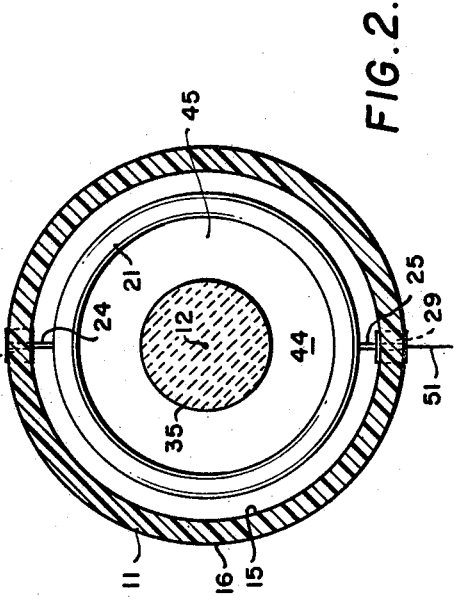
INVENTOR.
NORMAN P. HUFFNAGLE
BY
ATTYS.

United States Patent Office 3,496,484
Patented Feb. 17, 1970

3,496,484
OPTICAL MASER
Norman P. Huffnagle, 607 W. 11th St.,
Panama City, Fla. 32401
Filed June 29, 1964, Ser. No. 379,056
Int. Cl. H01s 1/06
U.S. Cl. 331—94.5           7 Claims

ABSTRACT OF THE DISCLOSURE

An optical maser containing a laser rod with the output end thereof exposed to the ambient environment and the remainder thereof disposed within a Pyrex glass housing that has substantially the entire inner surface thereof coated with an inwardly-focusing, mirror-like, light-reflecting coating. Electrically energizable pumping electrode rings spatially surround said laser rod, and an ionizable gaseous mixture fills the remaining space within said housing in contact with the outer surfaces of said laser rod and electrode rings and the entire inner surface of said light reflecting coating.

The invention described herein may be manufactured and used by or for the Government of the United States of America for governmental purposes without the payment of any royalties thereon or therefor.

The present invention concerns masers in general and in particular is an optical maser pumping system that produces collimated monochromatic radiant energy at a very high efficiency level.

In the past, it has been extremely difficult, if not impossible, to produce optical masers that have a yield that is actually greater than ten percent of the highest possible theoretical yield. This is due, in part, to the fact that operationally approaching such ten percent yield ordinarily requires the laser to be cooled to the temperature of liquid hydrogen, and also to the fact that a considerable portion of said cooling is necessary just to prevent self-destruction of the laser itself. Such cooling requirements obviously necessitate the use of high power, burdensome, and expensive ancillary cooling equipment, in order to make a laser energizing system that has some useful practical effect.

The present invention overcomes many of the disadvantages of similar type prior art devices in that it provides an output yield that is theoretically greater than that known to have been attained heretofore. Moreover, the improved efficiency of the subject device is effected without having to use refrigeration apparatus in association therewith for the cooling thereof. Thus, the power requirements, bulk, and expense of manufacture and operation are considerably reduced and, at the same time, the efficiency is increased.

It is, therefore, an object of this invention to provide an improved optical maser.

Another object of this invention is to provide an improved method and means for energizing a laser.

Still another object of this invention is to provide an optical maser pumping head having considerably improved efficiency.

Another object of this invention is to provide an optical maser having a considerably improved radiant energy yield for any given power input.

A further object of this invention is to provide an improved and versatile method and means for energizing a plurality of types of lasers having different frequency, monochromatic radiant energy transmission characteristics.

Still another object of this invention is to provide an optical maser pumping system that does not overheat to the self-destructive state without ancillary cooling.

Still another object of this invention is to provide an optical maser energizing system that is sufficiently small to be hand held.

A further object of this invention is to provide an improved optical maser system that is manually portable, requires relatively low input power, and is easily manufactured, maintained and operated.

Another object of this invention is to provide a simple laser energizing system that is reliable and has a long life.

Other objects and many of the attendant advantages will be readily appreciated as the subject invention becomes better understood by reference to the following detailed description when considered in conjunction with the accompany drawing wherein:

FIG. 1 is a combination cross-sectional and elevational view and block diagram of the optical maser pumping head system constituting this invention; and FIG. 2 is a cross-sectional view of the invention taken at 2—2 of FIG. 1.

Referring now to FIGS. 1 and 2, there is shown a substantially cylindrical housing 11, having an axis of revolution 12. The ends 13 and 14 thereof are shaped and located in such manner that the energy reflected from the inner surfaces thereof is directed toward the aforesaid longitudinal axis, as will be further explained, subsequently, in the discussion of the operation of the invention. Housing 11 is preferably made of Pyrex glass with the geometrical configuration thereof such that it may be formed as a one-piece, unitary construction. Of course, other materials, such as suitable plastics, metal, and the like, that are capable of being properly formed may also be used in the construction of housing 11.

Both the inner and outer surfaces of housing 11 are coated with mirror-like radiant energy reflecting coatings 15 and 16, respectively. Although any suitable reflecting coatings may be used for this purpose, silver films are preferable in the instant embodiment of the invention, and, of course, they are preferably vacuum deposited on their respective housing surfaces to insure uniformness of thickness and optimum radiating power and efficiency.

Housing 11 may be mounted on or supported by any appropriate mounting means 17, as by clamping or by a cement 18, if so desired. Obviously, the particular application of the subject invention will determine the best way to mount it, and making such a design choice would be well within the purview of the skilled artisan.

Respectively disposed at locations adjacent to each end of housing 11, is a pair of electrode rings 19 and 21, and these rings are firmly held in their respective positions by supports 22 through 25. As may readily be seen, supports 23 and 25 also act as electrical conductors as well as mechanical support members. Electrode rings 19 and 21 and their associated support members are preferably made of some chemically and electrochemically inert material such as, for example, platinum, or the like.

A plurality of insulators 26 through 29 are preferably employed to insulate electrode rings 19 and 21 and their support members from the silver coatings disposed on the inside and outside surfaces of housing 11 and housing 11, itself, if the material selected therefor is electrically conductive. For the purpose of securing these parts properly to each other, cements 31 through 34 may be used. An example of a cement that is suitable for such purposes is cement R313 manufactured by Carl H. Biggs and Company, Santa Monica, Calif.

A laser rod 35 of any appropriate predetermined material, such as, for example, ruby (aluminum-magnesium-silicon oxide), is mounted within housing 11 in such manner that its longitudinal axis coincides with the axis of revolution thereof. Although a ruby material is herewith disclosed as being the preferred type of laser, it should be understood that this choice is not to be considered limiting, and that any other suitable laser material may be used. For instance, other materials that make suitable laser rods are glass rods doped with neodymium or dysprosyium, or rods of calcium fluoride or chellate may be used.

As it is illustrated in FIG. 1 laser rod 35 is substantially cylindrical in shape. The transmitting end thereof is an optical flat surface 36 that is within $0.8\lambda$, where $\lambda$ is the wavelength of the radiant energy transmitted by the rod. Said flat surface may be coated to provide a semi-inwardly reflecting surface, if desired, and is ordinarily disposed normal to the longitudinal axis of the rod. The other end of laser rod 35 has a conically shaped portion 37, with the critical angle thereof preferably determined by the equation:

$$\sin \phi_c = \eta'/\eta$$

where:

$\phi_c$ = the critical angle between the conical surface and the longitudinal axis of the rod,
$\eta'$ = the index of refraction of the boundary medium, and
$\eta$ = the index of refraction of the traveling medium.

Using this formula is not intended to limit the taper angle of the laser rod; however, it has been found to be expedient to use an overall taper angle of between 45° and 90°.

The outside surface of conical shaped portion 37 is plated with a mirror-like inwardly-reflecting surface 38 in a manner similar to the inside and outside surfaces of housing 11.

Laser rod 35 is actually supported by the end sections thereof, with the left end inserted in an aperture 39 located in the end of housing 11, and it is cemented therein by any appropriate cement 41, such as the aforementioned R313 or fiber glass loaded R313. The right-hand end of laser rod 35 is supported as a result of its taper portion likewise being cemented in a complementary wedge 42 in housing 11 by a suitable cement 43. Of course, for most practical purposes, the aforementioned joints may be cemented together, respectively, by the same type of cement as mentioned above in connection with the mounting of electrode rings 19 and 21; however, it should be understood that any appropriate cement may be used at any particular structural junction, as long as strength requirements are met, as long as joint flexibility characteristics are satisfactory, and as long as all other structural, operational, and environmental requirements are satisfied. Although not disclosed in the view of FIG. 1, an alternate arrangement may be used in mounting the right hand end of laser rod 35 in housing 11. This arrangement would include having the entire taper portion thereof wedged and cemented in a larger wedge in housing 11 without the taper surface thereof being mirror plated. In this particular case, mirror surfacing of the taper would not be necessary because the interface of the taper portion of the laser rod and the housing material would provide an adequate reflecting surface for the internal laser energy.

Because the inside diameter of housing 11 is greater than the outside diameter of laser rod 35, a chamber 44 therebetween is formed. This chamber is air tight and filled, preferably at a low pressure (say, for example, of the order of 5 mm. Hg) with an ionizable gas or gaseous mixture that is capable of energizing and pumping laser rod 35 when it is ionized. Of course, the type of gas used is contingent on the selected optical maser operation.

It should be understood, however, that numerous individual gases or gas mixtures may excite any one or many different laser materials. In the preferred embodiment herewith disclosed, a gaseous mixture 45 of 40% helium, 40% argon, 19% mercury, and 1% xenon by volume is disposed within chamber 44. This, of course, may be accomplished by standard electron tube evacuation and filling procedures or any other conventional procedures that adequately produce the desired effect.

Other gases, such as practically pure hydrogen plus a trace of mercury (to prevent Hg precipitation on the laser rod surface), or a mixture of 90% helium and 10% xenon by volume may also be used for laser excitation and pumping purposes. Each of the former mentioned gases give off radiant energy in the visual portion of the spectrum when ionized, while the latter mentioned gas may be used in conjunction with a conventional infrared filter 46 to transmit collimated radiant energy in the invisible portion of the spectrum. 100% xenon is also emanently suitable for this latter mentioned purpose. Infrared filter 46, of course, is held in the transmission path of laser 35 in such manner that the collimated radiant energy transmitted therefrom passes therethrough, when invisible radiant energy is desired. Any suitable filter mount 47 is employed, and it may or may not be attached to mounting 17. Any relative positioning of filter 47 and transmitting surface 36 that meets the optical requirements of the inventive system during any given operational circumstances may, of course, be readily selected by the artisan. Indeed, it should be understood that using filter 46 at all is purely optional during any given operational circumstances.

A pulsed high voltage power supply 48, such as, for example, a pulsed transformer-capacitor discharge power supply, timely supplies electrical power through conductors 49 and 51 to electrode rings 19 and 21. A power supply controller 52 of any appropriate conventional type is coupled to power supply 48 for adjusting and controlling the frequency and power supplied thereby.

The operation of the invention will now be discussed briefly as follows:

Bursts of electrical power are supplied at a predetermined frequency to the electrode rings of the subject pumping head. The voltage or power required, of course, depends on the breakdown or ionizing voltage of the gas or gases disposed in chamber 44 and may vary, for example, from 60 to 600 volts. The repetition rate of said bursts may also vary in accordance with the laser materials used, and preferably should be such that the laser rod does not overheat by exceeding a temperature of 200° C.

These power bursts ionize the gas in the chamber, thereby producing radiant energy which is absorbed by the laser rod. In most instances, said radiant energy will be visible light and its absorption by the laser rod will cause it to be turned into a coherent visible beam that is projected out of flat transmitting surface 36. Whether or not it is light (that is, visible light) is immaterial from an operational standpoint, inasmuch as the operational procedure remains the same.

As previously mentioned, the silvered surfaces, including those at both ends of housing 11, are so shaped as to reflect and direct the light, or other radiant energy as the case may be, from the ionized gas to the laser rod. Because there is intimate contact between the ionized gas and the rod, there is no loss resulting from light energy passing through a glass-air interface, as is found in known current and prior art forms of optical masers. Also, the end of the laser rod is so tapered and silvered to act as a reflecting surface for all of the rod's internal radiant or light energy which, of course, considerably increases its internal efficiency.

Using mirror-like silvered surfaces in the manner taught herewith practically eliminates any light losses and considerably reduces all heat losses. Consequently, most of the energy generated within the invention is of the useful type and is projected out of the transmitting end 36 of the laser rod. Because the heat losses, if any, are extremely low, it is estimated that the overall efficiency of this invention approaches 20%.

Because the entire unit is relatively small, and since the rod may be of the variety that doesn't need cooling in order to function properly, if desired, it may be manually carried and battery powered, thereby increasing its usefulness and the number of possible applications to a considerable extent.

Obviously, other modifications and embodiments of the subject invention will readily come to the mind of one skilled in the art having the benefit of the teachings presented in the foregoing description in accompaniment with the associated drawing. Therefore, it is to be understood that the invention is not to be limited thereto and that said modification and embodiments are intended to be included within the scope of the appended claims.

What is claimed is:

1. An optical maser comprising in combination,
   a housing,
   an aperture located in one end of said housing,
   a wedge located in the other end of said housing,
   a laser rod, said laser rod having a flat transmission surface at one end thereof and a tapered surface at the other end thereof,
   a first mirror-like silver coating applied to the taper surface of said laser rod,
   means located adjacent the flat surface end of said laser rod for securely mounting it in said aperture,
   means disposed on a portion of the silver coating located on said laser rod taper for securely mounting it within said wedge,
   a chamber formed between the outside surface of said laser rod and the inside surface of said housing,
   a pair of electrode rings mounted for support by said housing and for surrounding said laser rod near the extremities thereof,
   an ionizable gas disposed within the aforesaid chamber in contact with said pair of electrode rings and said laser rod,
   a second mirror-like silver coating attached to the inner surface of said housing, and
   means interconnecting said housing and said electrode rings for insulating said electrode rings from the aforesaid inner surface silver coating.

2. The invention according to claim 1 further characterized by another mirror-like silver coating attached to the outer surface of said housing.

3. The invention according to claim 2 further characterized by a controllable power supply, and
   insulated electrical conductor means connected between said electrode rings and said controllable power supply.

4. The invention according to claim 2 further characterized by an infrared filter spatially disposed from the flat transmission surface of said laser rod in the path of the radiant energy propagated thereby.

5. The device of claim 1 wherein said ionizable gas comprises a gaseous mixture of the order of 40% helium, 40% argon, 19% mercury, and 1% xenon by volume.

6. The device of claim 1 wherein said ionizable gas comprises a gaseous mixture of hydrogen and a trace of mercury.

7. The device of claim 1 wherein said ionizable gas is xenon gas.

References Cited

UNITED STATES PATENTS

| | | | |
|---|---|---|---|
| 3,042,833 | 7/1962 | Willis | 313—218 |
| 3,353,115 | 11/1967 | Maiman | 331—94.5 |
| 3,379,997 | 4/1968 | Melhart | 331—94.5 |
| 3,164,782 | 1/1965 | Ordway | 331—94.5 |
| 3,166,673 | 1/1965 | Vickery et al. | 331—94.5 |
| 3,178,657 | 4/1965 | Morse | 331—94.5 |
| 3,229,222 | 1/1966 | Sorokin et al. | 331—94.5 |

RONALD L. WIBERT, Primary Examiner